(12) United States Patent
Maack

(10) Patent No.: US 12,420,495 B2
(45) Date of Patent: Sep. 23, 2025

(54) SYSTEM FOR PRODUCING AN IMPREGNATED FIBER ROVING

(71) Applicant: GRADEL, Ellange (LU)

(72) Inventor: Claude Maack, Fingig (LU)

(73) Assignee: GRADEL, Ellange (LU)

( * ) Notice: Subject to any disclaimer, the term of this patent is extended or adjusted under 35 U.S.C. 154(b) by 45 days.

(21) Appl. No.: 18/266,350

(22) PCT Filed: Dec. 17, 2021

(86) PCT No.: PCT/EP2021/086359
§ 371 (c)(1),
(2) Date: Jun. 9, 2023

(87) PCT Pub. No.: WO2022/129446
PCT Pub. Date: Jun. 23, 2022

(65) Prior Publication Data
US 2024/0316881 A1    Sep. 26, 2024

(30) Foreign Application Priority Data

Dec. 18, 2020   (LU) ........................................ 102328

(51) Int. Cl.
  *B29C 70/38*  (2006.01)
  *B29B 15/12*  (2006.01)
  *B29C 37/00*  (2006.01)

(52) U.S. Cl.
  CPC ............ *B29C 70/382* (2013.01); *B29B 15/12* (2013.01); *B29C 2037/90* (2013.01)

(58) Field of Classification Search
  CPC .................................................. B29C 70/382
  See application file for complete search history.

(56) References Cited

U.S. PATENT DOCUMENTS

| 3,273,987 A | 9/1966 | Marzocchi |
| 4,720,366 A | 1/1988 | Binnersley |

(Continued)

FOREIGN PATENT DOCUMENTS

| EP | 2071064 A1 | 6/2009 |
| IT | 102009901796608 A1 | 6/2011 |
| JP | 07-17025 B2 * | 3/1995 |

OTHER PUBLICATIONS

Machine Translation of Japanese Patent 07-17025, Date Unknown.*

(Continued)

*Primary Examiner* — Jeffry H Aftergut
(74) *Attorney, Agent, or Firm* — CANTOR COLBURN LLP

(57) ABSTRACT

A system for producing an impregnated fiber roving, the system including a feed unit having a spool with a fiber roving, an impregnation unit configured for applying liquid matrix material onto the moving fiber roving fed from the feed unit, a matrix supply unit fluidically connected to the impregnation unit for supplying liquid matrix material to the impregnation unit, a tension sensing unit adapted to determine a tension of the fiber roving fed from the feed unit to the impregnation unit, a speed sensor for determining a speed of the fiber roving fed from the feed unit to the impregnation unit, control means configured for monitoring the tension determined by the tension sensing unit and adapting the speed of the fiber roving depending on the monitored tension, monitoring the fiber roving speed determined by the speed sensor and adapting the supply of liquid matrix material based on the monitored fiber roving speed.

23 Claims, 2 Drawing Sheets

(56) References Cited

U.S. PATENT DOCUMENTS 5,766,357 A * 6/1998 Packer .................. B29B 15/122
  118/683
2005/0037195 A1 2/2005 Warek

OTHER PUBLICATIONS

International Search Report for corresponding application PCT/EP2021/086359 filed Dec. 17, 2021; Mail date Mar. 17, 2022.
Written Opinion for corresponding application PCT/EP2021/086359 filed Dec. 17, 2021; Mail date Mar. 17, 2022.

* cited by examiner

SYSTEM FOR PRODUCING AN IMPREGNATED FIBER ROVING

TECHNICAL FIELD

The disclosure generally relates to the field of fiber roving impregnation, and more particularly to a system for producing an impregnated fiber roving.

BACKGROUND

Additive manufacturing of simple or complex three-dimensional components wound of endless fiber rovings is a known technology, according to which an impregnated roving is wound on or around a winding tool. After the winding process, the component may be cured in an oven. The winding process can be realized by hand winding or by an automated winding machine, such as e.g. an industrial winding robot comprising up to 6 or more axis, depending on complexity of the winding tool.

The winding process can be carried out using pre-impregnated rovings (known as TowPreg) and is referred to as dry winding, or using wet impregnated rovings, and is referred to as wet winding. Fiber rovings are impregnated with a matrix material prior to their winding to improve their physical and mechanical characteristics. TowPregs are pre-impregnated fiber rovings stored at low temperature to stop the polymerization process of matrix and are available on market.

Compared to TowPreg, the use of wet impregnated rovings has enormous advantages. No storage in a freezer at negative temperature is needed and the rovings present no limited shelf life. Moreover, they allow the highest flexibility in miscellaneous applications in terms of the combination of various fiber materials and matrix materials. There is no dependency on any TowPreg supplier which leads to lower cost in production. Furthermore, as requirements for components (i.e. type of fiber and matrix material) are varying a lot depending on the end-user application, e.g. space, aeronautics, automotive, medical, sport articles or furniture, using wet impregnated fiber rovings produced on demand with a specific combination of fiber and matrix guarantees highest flexibility.

When performing a wet winding process to create rotationally symmetrical parts, the fiber roving is generally passed through a bath of matrix before being wound. However, this method is limited for being practicable for a fully automated winding process of complex three-dimensional parts using an industrial robot, because the spool from which the roving is unwound is not mounted on the robot. And since the roving must be held under tension from the impregnation unit to the winding head, the freedom of movement of the robot is restricted and the risk of collision between winding tool and roving is increased and thus, the multiple axis of the robot cannot be used in their entirety.

Another drawback of the conventional impregnating process of a fiber roving using a bath of matrix is that it is an open process in which a large amount of pre-mixed matrix material remains in the bath for a long time. Crosslinking reactions may occur there, which changes the viscosity of the matrix material and negatively impact the subsequent impregnation of the fiber roving. Therefore, only some matrix materials having a long crosslinking or processing time can be used.

BRIEF SUMMARY

The present disclosure provides a system for producing an impregnated fiber roving, the system comprising:

- a feed unit comprising a spool with a fiber roving;
- an impregnation unit configured for applying liquid matrix material onto the moving fiber roving fed from the feed unit;
- a matrix supply unit fluidically connected to the impregnation unit for supplying liquid matrix material to the impregnation unit;
- a tension sensing unit adapted to determine a tension of the fiber roving fed from the feed unit to the impregnation unit;
- a speed sensor for determining a speed of the fiber roving fed from the feed unit to the impregnation unit; and
- control means configured for:
  - monitoring the tension determined by the tension sensing unit and adapting the speed of the fiber roving depending on the monitored tension;
  - monitoring the fiber roving speed determined by the speed sensor and adapting the supply of liquid matrix material based on the monitored fiber roving speed.

In the present text, the expression fiber roving (or simply roving) refers to a long and narrow bundle of fibers. Matrix (or matrix material) means any composition suitable for impregnating a fiber roving and binding the fibers together upon hardening/drying. The matrix is normally a mixture of resin and hardener, and possibly additives if any are needed for improving technical characteristics. Any of a variety of thermoplastic or thermoset polymers may be employed to form the polymer matrix. The matrix is normally a liquid matrix, i.e. the matrix can flow under gravity or under application of a pressure. It is to be understood that the term liquid matrix refers to the state of the matrix during the impregnation process; a low viscosity being preferred to facilitate impregnation. Some resins may be rubberlike at room temperature, but more liquid (lower viscosity) at the temperature used during the impregnation process. Matrix material comprising such a resin is to be understood as liquid matrix material. Moreover, matrixes consisting of colloidal or particulate suspensions are to be understood as liquid matrixes for the present text. At the time the matrix material is inside the impregnation unit, the matrix is normally liquid; it will dry/harden after the fiber roving has been wound according to the desired design/application.

Advantageously, the system for producing an impregnated fiber roving is adapted to impregnate all kinds of fiber rovings. Fiber rovings may be made from various types of fibers, such as carbon, glass, natural fibers like basalt, chamfer, beech wood and others. These fibers differ from each other by their physical properties, and by their possible applications. Moreover, the number of individual fibers of the roving varies according to the requirements. However, every type of fiber roving can be impregnated with the inventive system for producing an impregnated fiber roving. In other words, the present inventive system for producing an impregnated fiber roving is characterized by its versatility to master the process of impregnation independently of the fiber roving fed in, and to provide an impregnated fiber with the best homogeneity. Advantageously, with the present disclosure, rovings can be impregnated with a fiber count of at least 1000, such as 1000, 2000, 3000, 6000, 8000, 12000, 16000, 24000 or 50000 fibers, or even more fibers. The fibers are generally of great length, e.g. in the order of kilometers, and one may thus refer to endless fiber rovings. It is to be noted that the length of the fiber roving generally depends on the thickness of the fibers forming the fiber roving and on the size of the bobbin supporting the roving.

The impregnation unit is also adapted to operate with any kind of matrix, so that miscellaneous types of resins can be used.

The inventive system for producing an impregnated fiber roving is adapted to impregnate any kind of fiber roving with any kind of matrix. The general ratio of matrix to roving (i.e. amount of matrix material per unit length of fiber roving) is adjustable, depending on the respective process parameters (e.g. fiber size and number, viscosity of matrix) and the amount of matrix desirable for the wound component to be manufactured from the impregnated fiber roving. According to the disclosure, the fiber roving is impregnated just before being wound to a desired shape, i.e. the winding process is a wet winding process. Fiber rovings impregnated by the present inventive system may be used in a fully automatic, multidimensional winding process allowing wounding of all kind of shapes, from simple rotation symmetrical parts up to high complex 3D-components.

The inventive concept of the present system for producing an impregnated fiber roving relies upon both regulating the speed fiber roving depending on the monitored tension of the fiber roving; and regulating the supply of liquid matrix material based on the monitored speed of the fiber roving. Monitoring of both the tension and the speed of the fiber roving may occur simultaneously or alternatively, continuously or periodically during the winding process.

The monitoring of the tension and the speed of the fiber roving and consequent adaptation of process steps (i.e. adaptation of the rotation speed of the spool and adaptation the supply of liquid matrix material) ensures a homogeneous impregnation of the fiber roving along its whole length and width, regardless of the fact that some portions of the roving may have been conveyed through the impregnation unit with different speeds. Indeed, tension is a relevant parameter, as a proper tension of the roving should be maintained in the impregnation unit to achieve a homogeneous impregnation of the fiber roving. Moreover, the actual speed of the fiber roving is another relevant parameter, as more matrix material should be provided to portion of a fiber roving moving at higher speed to achieve a homogeneous impregnation thereof (i.e. meeting a desired ratio of matrix to roving).

Furthermore, a homogeneous repartition of liquid matrix material along the whole length and width of the fiber roving at highest and lowest speed is a major parameter for the repeatability of the impregnation process and thus a key quality parameter. The present inventive system therefore allows improving the quality and repeatability of the impregnation process carried out in the impregnation unit of the system for producing an impregnated fiber roving.

In use, where the present system is combined with a machine or industrial robot configured to apply the impregnated fiber roving and which moves the impregnation unit, the speed of the fiber roving is affected by the pulling force exerted due to moves of the machine/robot.

In some applications, in particular for certain shapes, the system may include a feeder located downstream of the impregnation unit, that pulls the fiber roving from the spool without external pulling forces exerted by the machine, robot or winding tool.

In embodiments, adapting the speed of the fiber roving depending on the monitored tension may carried out through control means configured for acting on the movements of the machine, robot or winding tool, or of the feeder, in order to accelerate or decelerate the roving speed (i.e. by modifying the pull force exerted on the roving due to machine, robot or winding tool movements).

However, for ease of implementation, it is preferred not to interfere with the control program of the machine, robot or winding tool, and to operate the present system by means of a dedicated control means. In this context, the feed unit may comprise a drive motor coupled to the spool of fiber roving and operated by the control means to regulate the rotation speed of the spool. The control means may thus be configured to regulate the rotation speed of the spool in order to maintain a target tension of the fiber roving. In general, for a given type of fiber roving and for a given application, the tension of the target tension is normally constant.

According to the same or alternative embodiments, controlling the supply of liquid matrix material includes controlling a pressure and/or flow rate of the liquid matrix material.

The matrix supply unit comprises at least one tank.

An embodiment with one tank comprising a pre-processed (i.e. pre-mixed) matrix material may be envisaged, in case the matrix is a single component type, or if for any reasons the matrix is processed separately in a (remote) mixing unit. This single tank may be connected to the impregnation unit via a dosing device, for controlling the flow of matrix applied to the fiber roving. The dosing device may include a motorized pump.

Advantageously, the matrix supply unit comprises at least two tanks connected to a mixing section, the mixing section being connected by a matrix feed piping to the impregnation unit, the first tank comprising a resin and the second tank comprising a hardener. Additives, if any are required in the liquid matrix material, are preferably mixed with the resin when filling the first tank. The resin and the hardener are thus stored in separate tanks, and contact each other only moments before impregnation of the fiber roving, thus reducing the risk of potential undesired side reactions, or of matrix material ageing (resulting in e.g. increased viscosity). Moreover, no storage of the matrix material at low temperature is needed, as the hardener is brought in contact with the resin just before the impregnation and winding process.

In such embodiments, the mixing section may comprise a chamber and a mixing pipe, the mixing pipe being arranged downstream of the chamber. The resin and the hardener first contact each other in the chamber, and a thorough mixing occurs in the mixing pipe, resulting in the formation of the liquid matrix material.

Advantageously, the mixing section is connected to the first tank by a first dosing device and is connected to the second tank by a second dosing device. Preferably, the first dosing device and/or the second dosing device are automated to be controlled remotely. According to such embodiments, the step of adapting the supply of liquid matrix material may include regulating a pumping rate of the first and/or second dosing device based on the fiber roving speed.

The dosing devices may include motorized pumps, e.g. an Archimedes' screw driven by an electric motor.

Alternatively, the tanks are not equipped with a dosing device and the pumping rate is regulated by varying the pressure in the tank(s) (e.g. air pressure applied on tank inlet side). This may be less precise than using motorized pumps, but the system is less complex and therefore more cost effective for applications with lower requirements.

In preferred embodiments, the system for producing an impregnated fiber roving further comprises a guide unit arranged near an outlet aperture of the impregnation unit, the guide unit comprising at least a guide nozzle and the fiber roving being conveyed through an internal pathway in the guide unit.

Advantageously, the guide unit may further comprise a motorized feeder. In embodiments where the wet impregnated roving should not be submitted to a pull force during application on the winding tool, such as e.g. when the wet fiber roving is wound on concave shapes, the guide nozzle may comprise blowing nozzles arranged to blow compressed air onto the fiber roving conveyed through the guide unit in such a way as to accelerate the fiber roving. In alternative embodiments, where a pull force is exerted due to winding robot and/or tool movements, or manually, the guide nozzle may be a flexible spring loaded nozzle and/or a bended nozzle. A flexible bended spring loaded nozzle may be employed, depending on the application, for limiting risk of collision between nozzle, tool and already wound rovings.

According to preferred embodiments, the matrix supply unit further comprises a first flowrate sensor arranged between the first tank and the mixing section and a second flowrate sensor arranged between the second tank and the mixing section. According to such embodiments, adapting the supply of liquid matrix material includes increasing and/or decreasing a flow of resin from the first tank to the mixing section and/or a flow of hardener from the second tank to the mixing section based on the fiber roving speed.

Advantageously, each one of the first tank, the second tank and the mixing section comprises at least one temperature sensor, and preferably also a heating arrangement controlled by the control means based on the respective temperature determined by the respective temperature sensor. Preferably, control of a heating arrangement includes regulating a heating to maintain a target, preferably substantially constant, temperature of the respective liquid (i.e. resin, hardener or matrix material).

Preferably, the mixing section further comprises a first pressure sensor adapted to determine a pressure of the resin, a second pressure sensor adapted to determine a pressure of the hardener and a third pressure sensor adapted to determine a pressure of the matrix. The control means may be configured to regulate at least one, preferably all, of the determined pressures based on the fiber roving speed.

To summarize, an impregnation process carried out using the inventive system for producing an impregnated fiber roving is based on the monitoring of some process parameters and the adaptation of same or different process parameters depending on the actual values of the monitored parameters. Monitoring and adaptation of the process parameters can be performed during the whole winding process, allowing for a higher flexibility and a better adaptability of the winding process.

Indeed, the following parameters are monitored with the following consequences on the impregnation process. The tension of the fiber roving is monitored and the rotation speed of the spool of fiber roving is regulated to ensure a target, preferably constant, tension of the fiber roving. The actual speed of the fiber roving unwound from the spool and conveyed through the impregnation unit is monitored and the supply of liquid matrix material is adapted. Adaptation of the supply of liquid matrix material can be achieved through both a monitoring of the pressure of resin, hardener and matrix material; and a control of the flow rate of resin, hardener and matrix material, the control means of the system being configured to either increase or decrease the respective flow rates. The flow rates are regulated to allow for a constant ratio between resin and hardener in the produced matrix material, and to ensure that a constant ration of matrix material per unit length of fiber roving is supplied. As will be understood, to maintain a given ratio of matrix to roving, the control means are configured to increase in amount of matrix supplied to the impregnation head when the speed roving increases.

Furthermore, the control means are advantageously configured to regulate the heating power of the respective heating arrangement of the first tank, the second tank and the mixing pipe depending on the measured respective temperatures, in order to maintain the resin, the hardener and the matrix material at pre-determined temperature (typically constant for a given compositions of resin, resp. hardener). Respective, target temperatures of resin, hardener and matrix material may be identical or different, depending on the type of resin and hardener. The ability to control the temperature of the liquid matrix material allows maintaining the same viscosity of the liquid independent of room temperature, which is key for the quality of the impregnation.

Monitoring of these process parameters may occur simultaneously or each parameter may be monitor one after the other in a defined, cyclic order. The parameters may be monitored continuously or at predefined time intervals after starting the winding process.

From the above, it will appear that the various sensors and actuators (motors, dosing devices, heating arrangements, pressure sensors, etc.) of the inventive system are connected to the same control means, which are configured to monitor the process parameters, compare determined parameter to target values where applicable, and take appropriate actions by way of the actuators. All relevant parameters (e.g. speed and tension of the fiber roving, temperature and pressure of the resin, the hardener and the matrix material) are monitored by the same control means, e.g. a programmable controller. The control means can therefore adapt the impregnation process depending on all the actual parameters, further improving the homogeneity of the matrix material repartition over the length and width of the fiber roving.

As the control means acquire all relevant parameters determined via the various sensors and control the process steps accordingly during the impregnation and winding of the wet impregnated fiber roving, it contributes to an increase in impregnation quality and flexibility. The inventive system allows reproducing highest quality standards as required in space, aeronautics, automotive, medical, sport equipment, furniture and others.

All the determined (e.g. measured) and monitored parameters governing the impregnation process (e.g. speed and tension of the fiber roving; temperatures, flow rates, and pressures of the resin, the hardener and the liquid matrix material) may be stored, compared to their target values and linked to the series number of the component wounded using the produced impregnated fiber roving with date and time of production. A quality registration report linked to each component can thus be provided at any time after production in case of demand. This report may be used for prediction of maintenance of the production equipment (such as but without being limited to the inventive system for producing an impregnated fiber roving, winding tool) and is useful in case of customer claims. Production of a quality registration report is advantageous for high end applications e.g. space, aeronautics and automotive when roots of cause for failure must be mastered.

BRIEF DESCRIPTION OF THE DRAWINGS

Further details and advantages of the present disclosure will be apparent from the following detailed description of not limiting embodiments with reference to the attached drawings, wherein.

DETAILED DESCRIPTION

Figure 1:
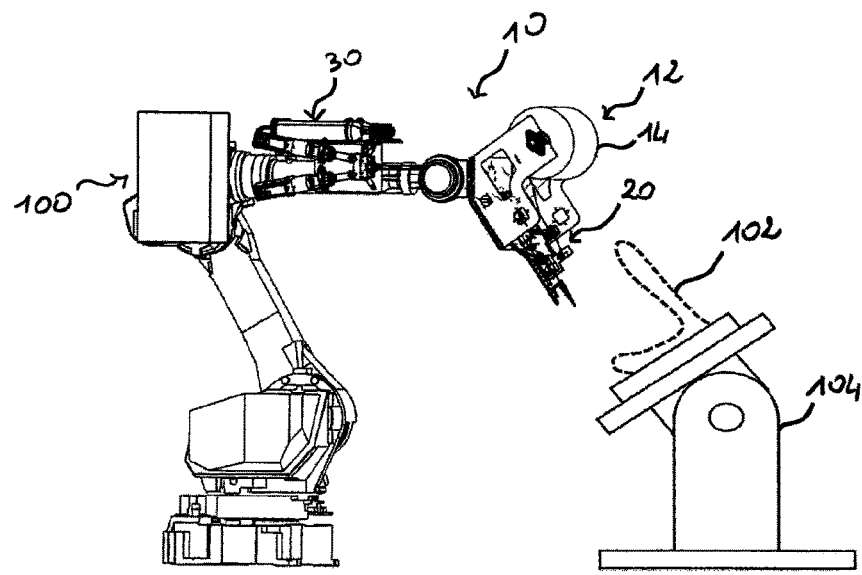
FIG. 1 is a schematic view of an industrial robot for a winding process equipped with an embodiment of the present inventive system for producing an impregnated fiber roving.

A system 10 for producing an impregnated fiber roving generally comprises a feed unit 12 with a spool 14 of fiber roving 16, and an impregnation unit 20 connected to a matrix supply unit 30 and configured to impregnate a fiber roving 16 conveyed therethrough with a liquid matrix. The matrix (or matrix material) is a mixture of resin, hardener and additives for improving technical characteristics required by application fields of the impregnated fiber roving. The system 10 can be mounted on an industrial robot 100 as presented in FIG. 1, the industrial robot 100 being configured to wind the wet impregnated roving produced by the system 10 to a desired shape onto a winding tool 102. As shown, the industrial robot 100 may be a vertical articulated robot, comprising e.g. 6 axes. The matrix supply unit 30 is here arranged on the $4^{th}$ axis of the robot and the impregnation unit 20 is arranged on the $6^{th}$ of the robot, while the winding tool 102 is mounted on an auxiliary pan and tilt axis 104 of the industrial robot 100.

Although the present system 10 has been particularly developed for use with multi-axis industrial robots 100, it may alternatively be arranged on a static base plate. Mounting of the system on either the industrial robot 100 winding the impregnated fiber roving or a static base plate is independent of the application of the produced impregnated fiber roving.

The present system 10 is designed to operate a wet winding process, where a dry fiber roving is unwound from the spool 14 and wetted/impregnated with matrix material as it is guided through the impregnation unit 20.

As it will be known to those skilled in the art, the impregnated fiber roving is then submitted to a winding process, i.e. it is applied or wound on or around a winding tool 102 in order to produce a simple or complex three-dimensional component. After winding, the wound component may be cured in an oven. The winding process can be carried out by hand or by an automated winding machine, as is the case with robot 100. Also, where the system 10 is static, it can be combined with an automated winding machine or wound by hand. In terms of control, the robot 100 is generally connected to a control unit, e.g. a programmable logic controller, here designated PLC-1 (not shown), that is programmed in order to control robot moves. Typically, the program for the robot (with auxiliary axis) is done by means of a CAD/CAM system. This program allows running winding plans (or winding paths) defining the sequence of robot moves in order to manufacture a given component. The present system 10 is an accessory of the robot 100 and the impregnation unit 20 forms an end effector on the robot arm. In the context of robot control, a relevant position that is customarily used is the tool center point TCP, indicated in the figures. The TCP corresponds to the location where the wet/impregnated roving is discharged from the end effector, i.e. the impregnation head 20, or possibly the outlet end of an accessory of the impregnation head such as e.g. a guide unit and/or feeder (see below). The robot moves are programmed such that the TCP describes a predetermined path to manufacture the desired woven component.

Figure 2:
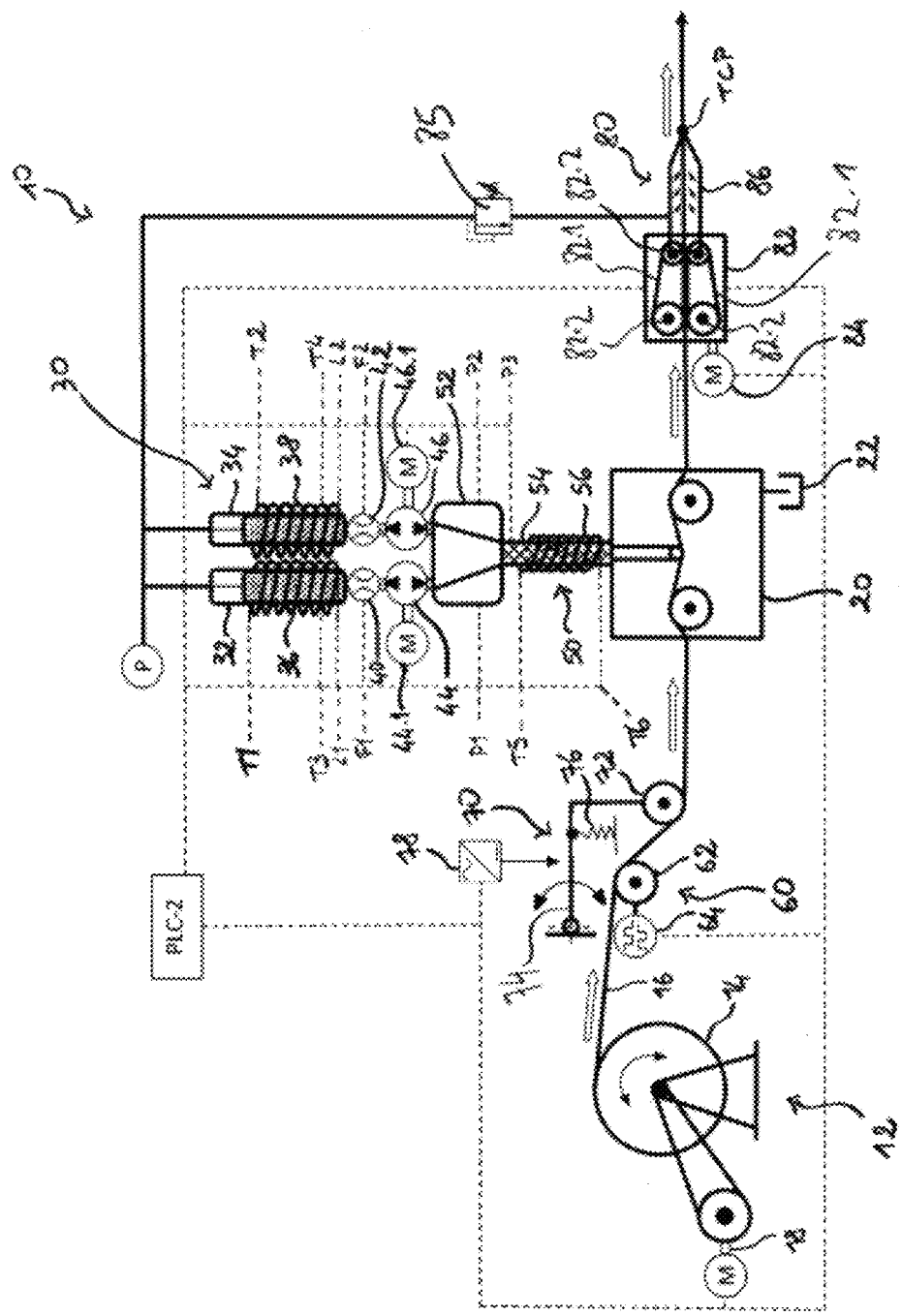
FIG. 2 is a principle diagram of the system for producing an impregnated fiber roving.

Turning now to FIG. 2, an embodiment of the inventive system 10 for producing an impregnated fiber roving will be described in detail.

In the figure, the feed unit 12 with spool 14 is illustrated on the left. The fiber roving 16 is wound on the spool 14 and, in use, unwound therefrom to be forwarded/conveyed to the right, where it is fed to the impregnation unit 20. The conveying direction, or forward direction, is indicated by the arrows in FIG. 2. On the spool 14, the fiber roving 16 is dry, and enters the impregnation unit 20 from the left in the dry state. The roving 16 exits the impregnation unit 20 (on the right-hand side) in a wet state, the fibers being impregnated with matrix material. The matrix supply unit 30 is represented above the impregnation unit 20, but this is not a requirement. In practice, the skilled person will locate the matrix supply unit 30 where appropriate, depending on the manufacturing site and constraints. For example, in the embodiment of FIG. 1, the matrix supply unit 30 is separate from the impregnation unit 20, mounted on a different axis on the robot 100.

The present system 10 is compatible with all kinds of fiber rovings. The fiber roving 16 may be made from all kind of fibers, such as carbon, glass, natural fibers like basalt, chamfer, beech wood and others, and present various fiber counts, such as e.g. 1000, 2000, 3000, 6000, 8000, 12000, 16000, 24000 or 50000 fibers, or even more. The fibers are generally of great length, e.g. in the order of multiple kilometers, and one may thus refer to endless fiber rovings. It is to be noted that the length of the fiber roving generally depends on the thickness of the fibers forming the fiber roving and on the size of the spool supporting the roving.

The fiber spool 14 is coupled to a drive motor 18 (gear motor). The drive motor 18 is operated to increase or decrease the rotation speed of the fiber spool 14 during the winding process, i.e. as the impregnated fiber roving 16 is wound on the winding tool 102.

The speed of the fiber roving 16 is measured by means of a speed sensor 60 comprising an idler pulley 62 with an encoder 64. The encoder 64 generates a sensor signal depending on the rotation speed of the idler pulley and thus representative of the speed of the fiber roving 16.

Reference sign 70 designates a tension sensing unit comprising a tensioner, a spring 76 and a positioning sensor 78, the tensioner comprising a pivoting lever system 74 with an idler pulley 72. The pivoting lever 74 of the tensioner is held in a defined middle position by the spring 76. In other words, the tensioner is balanced with the spring 76 in its central equilibrated position. When the lever 74 is in its middle position, the fiber roving 16 is tensioned with optimal force. If the tension of the roving changes, the lever 74 is deflected in one or the other direction by a certain distance from its original central position due to the change in the ratio of forces. The deflection is measured by means of the positioning sensor 78, which may e.g. include a laser measurement system. To increase the accuracy of the measurement, the positioning sensor 78 is positioned such that the largest possible deflection is measured. This deflection is directly proportional to the change in tension, and thus serves as an indicator of how the tension of the roving must be corrected. Based on the positioning sensor signal (representative of deflection and thus tension) it can therefore be concluded that the motor 18 of the feed unit 12 rotates either too slowly or too quickly depending on whether the tension increases or decreases.

In alternative embodiments, the tension can be determined by a direct measurement of the force on the idler pulley 72, as will appear to those skilled in the art.

In the present embodiment, the fiber roving 16 is first conveyed to the speed sensor 60 and then to the tension sensing unit 70. Alternatively, the tension sensing unit 70 could be arranged upstream of the speed sensor 60 along the conveying path of the fiber roving in the system 10.

It may be noted at this point that the tension of the roving during impregnation is, in conventional systems, typically not taken into account in the robot control. That is, the robot control program run by the robot controller is not configured to monitor nor adapt parameters based on the tension of the roving during impregnation. It is also the case here for PLC-1.

The tension of the roving is however a relevant parameter of the winding process, as a proper tension of the roving should be maintained in the impregnation unit 20 to achieve a homogeneous impregnation of the fiber roving. Accordingly, the present system 10 for producing an impregnated fiber roving comprises a programmable controller, here designated PLC-2, that is connected to the tension sensing unit and receives a sensor signal indicative of the tension of the fiber roving 16.

As a matter of fact, in this embodiment, both the speed sensor 60 and the tension sensing unit 70 are connected to the controller PLC-2. The controller PLC-2 is also connected to the motor 18 of the feed unit 12. It will be appreciated that controller PLC-2 is configured to adapt the rotation speed of the spool 14 depending on the actual tension of the fiber roving 16, as determined by tension sensing unit 70. The motor speed hence depends on the speed of the fiber roving 16, which is measured by the encoder 64 of the idler pulley 62 of the speed sensor 60 and the controller PLC-2 controls the motor 18 so that it either accelerates or decelerates to keep the lever 74 of the tension sensing unit 70 in its center position. Hence, the control of tension carried out by PLC-2 implies controlling the tension such that it meets a target tension value, or remains within a given tolerance range about this target tension value. As the conveying speed of the fiber roving 16 depends on the rotation speed of the spool 14, the conveying speed within system 10 is controlled by the controller PLC-2.

Downstream of both the speed sensor 60 and the tension sensing unit 70, the fiber roving 14 is fed to the impregnation unit 20 fluidically connected to the matrix supply unit 30. The impregnation unit 20 is generally configured to apply a liquid matrix supplied by the matrix supply unit 30 onto the moving (i.e. conveyed) fiber roving 16. In other words, a dry fiber roving enters the impregnation unit 20, is conveyed through an internal pathway of the impregnation unit 20 where a liquid matrix is applied thereon, and exits the impregnation unit 20 as a wet impregnated fiber roving. As is known in the art, the impregnation unit 20 may typically comprise a spreading section to spread the fiber roving, a wetting section where the liquid matrix material is applied onto the moving fiber roving and a baffle section to force/press the matrix within the fibers. Excess matrix material, if any, may be collected e.g. by means of a vacuum hose 22. The impregnation unit 20 is only schematically shown in FIG. 2 and a variety of designs can be envisaged by those skilled in the art. It will not be further described since it is not the focus of the disclosure.

In the present embodiment, the matrix supply unit 30 comprises a first tank 32 comprising a resin and a second tank 34, separate from the first tank, comprising a hardener. Additives, if any are required in the matrix, are mixed to the resin when filling the first tank 32. Both tanks 32, 34 are equipped with an electrical heating sleeve 36, 38 for keeping the resin and hardener at a predetermined (constant) temperature.

Each tank 32, 34 further comprises two temperature sensors T1, T2, T3, T4, sensors T1, T2 being arranged on the upper part of each tank 32, 34 and the other sensor T3, T4 being arranged on the lowest part of the tanks 32, 34. The sensors T1, T2, T3, T4 measure the temperature of the resin and hardener inside the tanks 32, 34 and are connected to the controller PLC-2. The controller PLC-2 regulates the electrical power of the electrical heating sleeves 36, 38 depending on the measured temperatures, in order to keep the resin and the hardener at the pre-determined temperature (typically constant for a given compositions of resin, resp. hardener).

Each tank 32, 34 is connected to a pneumatic air pressure system P in order to allow the matrix supply unit 30 to provide matrix to the impregnation unit 20 in any position, e.g. upside down. Typically, a sliding plunger/cover may be arranged on the inlet side of the tanks, wherein the air pressure applies on the plunger/cover, in turn pushing on the material in the tanks. The resin and hardener are thus maintained under a predetermined pressure in the tanks (applied on the inlet side of the tanks by the compressed air).

Each tank 32, 34 is further connected to a mixing section 50 of the matrix supply unit 30 through a respective flowrate sensor (or flowmeter) 40, 42 and a respective dosing device comprising a pump 44, 46, each pump being connected to a motor 44.1, 46.1. Typically, the pumps may comprise an Archimede's screw coupled to a respective electric motor 44.1, 46.1. An Archimedes' screw acts as a regulating valve allows flowing the material in both directions forward, rearward and even stop (the stop position is possible even if there is pressure in the tank and the motor is stopped).

The flow of resin and hardener is separately measured with the two flowrate sensors 40, 42. This allows guaranteeing that the correct ratio of resin vs. hardener is controlled at any time and used to produce the matrix by mixing the resin and hardener in the mixing section 50. The mixing ratio of the individual matrix components is controlled before and during the entire impregnation process. The required ratio and flowrate of matrix are therefore guaranteed precisely, as the motors 44.1, 46.1 of the pumps are controlled by the controller PLC-2 depending on the actual speed of the fiber roving 16, as determined by the speed sensor 60. In other words, the motors 44.1, 46.1 are slave of the speed of the roving, which is continuously measured by the encoder 64 of the idler pulley 62.

The ratio of the resin and hardener has to be kept constant accordingly with the datasheet of the matrix material and is also controlled by the PLC-2. As a consequence, the motor 46.1 is slave of the motor 44.1.

The motorized pumps 44, 46 can work in two directions, compression to supply matrix to the mixing section 50 (and therefore to the impregnation unit 20), and suction for taking of pressure in the system when stopping, in order to avoid uncontrolled leakage.

The mixing section 50 comprises a chamber 52 and a mixing pipe 54 downstream of the mixing chamber 52. Resin and hardener are coming in contact with each other for the first time in the chamber 52 of the mixing section 50, before flowing through the mixing pipe 54. The mixing pipe 54 has inside deviations (baffles) which are assuring a homogenous repartition of resin and hardener along the length of the mixing pipe 54. Outside of the mixing pipe 54, an electrical heating sleeve 56 is arranged and maintains the mixed matrix at a predetermined temperature. The ability to control the temperature of the matrix allows maintaining the same viscosity of the liquid independent of room temperature, which is key for the quality of the impregnation. Two temperature sensors T5, T6, connected to the controller PLC-2, measure the temperature of the matrix inside the mixing tube 54. The temperatures determined by these sensors T5, T6 are the input needed by the controller PLC-2 for regulating the electrical power of the electrical heating sleeve 56.

The mixing section 50 further comprises a first pressure sensor P1 determining the pressure of the resin on the inlet side of the chamber 52, a second pressure sensor P2 determining the pressure of the hardener on the inlet side of the chamber 52 and a third pressure sensor P3 determining the pressure of the mixture formed by the resin and the hardener on the outlet side of the chamber 52. The motorized pumps 44, 46 of the dosing devices are further controlled by the controller PLC-2 to regulate the pressures determined by the pressure sensors P1, P2 and P3 based on the speed of the fiber roving 16.

All the measured and controlled parameters and data governing the impregnation process (temperatures, flow rates, pressures) are preferably constantly stored, compared to their target values and linked to the series number of the manufactured component with date and time of production. A quality registration report linked to each component/part can thus be provided at any time after production in case of demand. This data is used for prediction of maintenance of the production equipment and is useful in case of customer claims. Production of a quality registration report is an important point for high end applications e.g. space, aeronautics and automotive when roots of cause for failure must be mastered.

As will have been understood, the various sensors and actuators (motors, pumps, sensors, etc.) of the system 10 are connected to the associated controller PLC-2, which is configured to monitor the process parameters (e.g. speed, tension, temperatures, pressures . . . ), compare to target values where applicable, and take appropriate actions by way of the actuators. Importantly, the controller PLC-2 is configured to monitor the tension in the system 10, in order to adapt the roving speed. The speed is adapted, here by actuating the motor 18, such that the tension corresponds to a target tension (within a given tolerance range). Additionally, the controller PLC-2 is configured to adapt the supply of liquid matrix material to the impregnation head based on the monitored fiber roving speed. In particular, the flow and pressure (parameters of relevance P1, P2, P3) are controlled in dependency of roving speed.

The wet impregnated fiber roving 16, exiting the impregnation unit 20, is further conveyed to a guide unit 80. In the embodiment of FIG. 2, the guide unit 80 comprises a feeder 82 with an associated drive motor 84 and a guide nozzle 86. The feeder 82 includes a pair of opposite belts 82.1 arranged to convey the wet fiber roving in the forward direction. The belts 82.1 are mounted on pulleys 82.2 coupled to the drive motor 84. The outlet of the feeder 82 is connected to the guide nozzle 86, which comprises a plurality of blowing nozzle in fluid communication with the pneumatic air pressure system P. The blowing nozzles are arranged inside the guide nozzle 86 to provide a plurality of compressed air streams, oriented in the forward direction, in order to accelerate the impregnated fiber roving by means of compressed air, i.e. without direct contact. The force resulting from the applied compressed air can vary from 0 to about 100 N. Reference sign 85 designates a control valve that allows regulating the flow of compressed air to the guiding nozzle.

In such embodiments (as shown on FIG. 2), the motorized feeder 82 of the guiding unit 80 allow pulling the fiber roving 16 through the impregnation unit 20. The feeder conveying speed is independent from the speed of the fiber roving 16 at the outlet of the guiding nozzle (or tool center point TCP), which is determined by the winding program and modified by the application of compressed air. The feeder speed may be identical to the speed of the fiber roving at the TCP but it can be slower or faster compared to the speed of the fiber roving at the TCP, depending on the geometry of the winding tool 102. Modification of the feeder speed with respect to the speed of the fiber roving at the TCP is especially of need for avoiding collisions between the guiding nozzle 86, and the winding tool 102 or already wound rovings. The drive motor 84 of the guide unit 80 is a gearmotor and the input for accelerating, decelerating, stopping or working with continuous speed depends on the winding path and is given by the robot controller PLC-1 (not shown) which is controlling the multi-axis winding machine. The resulting conveying speed of the fiber roving 16 is directly measured by the encoder 64 of the speed sensor 60 and thus the gearmotor 18 responsible for the unwinding of the spool 14 is regulated by the controller PLC-2 with regards to keeping the dry fiber roving 16 always under a defined tension.

It is to be noted that according to this embodiment, each one of the resin tank 32 and the hardener tank 34 further comprise a level sensor L1, L2. The level sensor L1 of the resin tank 32 determines the fill level of the resin tank, while the level sensor L2 in the hardener tank 34 determines the fill level of the hardener tank. The level sensors L1, L2 are connected to the controller PLC-2, which is further configured to prevent the starting of a new winding process by stopping the compressed air supply of the guiding nozzle 86 when the resin tank 32 or the hardener tank 34 is at 80% empty.

According to alternative embodiments, the guide unit 80 may comprises a guide tube 88 whose outlet is foreseen with a flexible spring-loaded nozzle 90 (FIG. 3) or a bended nozzle 92 (FIG. 4) depending on the application of the impregnated fiber roving and the complexity of the winding tool 102. The flexible spring-loaded nozzle 90 and the bended nozzle 92 can be made rigid in metal or also realized with a flexible hose for being flexible in case of minor collision with the winding tool. In embodiments wherein the guide unit 80 comprises a bended nozzle 92, the bended nozzle 92 is orientated by the 6th axis of the robot 100 depending on the displacement vector of the outlet of the guiding nozzle TCP. In other words, the TCP is programmed and orientation of the guide nozzle 92 is controlled by the tension of the fiber roving 16, so that the fiber roving present at any time the best possible orientation to be wounded, thus facilitating the winding process and the precision of the winding path.

Figure 3:
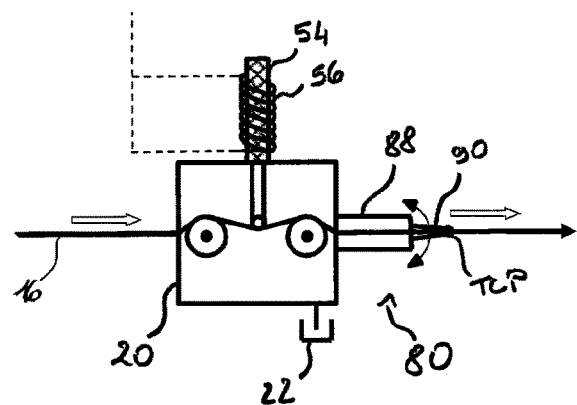
FIG. 3 is a schematic view of a second embodiment of the impregnation unit with a spring load bended nozzle.
Figure 4:
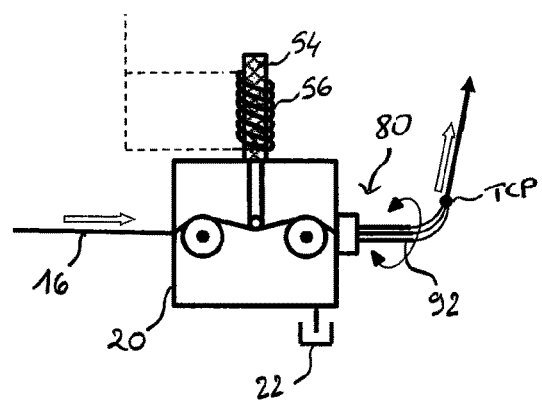
FIG. 4 is a schematic view of a third embodiment of the impregnation unit with an orientable nozzle.

In such alternative embodiments of FIG. 3 and FIG. 4 wherein the guiding unit 80 does not comprise a feeder 82 with at drive motor 84, the fiber roving 16 is pulled through the impregnation unit 20 by a force coming from the robot 100 and/or the auxiliary axis 104 on which the winding tool 102 is mounted It is to be noted that the force pulling the fiber roving through the impregnation unit 20 can thus be (additionally) implemented by a mobile winding tool, i.e. a winding tool 102 mounted on a mobile auxiliary axis 104 independently from the feeder speed if a feeder is present. This leads to the same result in terms of process regulation. The number of auxiliary axis 104 is not limited e.g. the whole robot 100 can move on 1 or 2 supplementary axis (e.g. on a pan and tilt table).

From the above, it must be concluded that the fiber roving presents a first speed inside the impregnation unit. This first speed results from a pulling force emanating from the winding robot and/or from one or more mobile winding tools. The first speed is monitored by the speed sensing unit and the control means adapt the rotation speed of the spool in order to prevent the fiber roving from having a speed which would result in a modification of its tension.

The fiber roving presents a second speed at the TCP, which is determined by the robot controller PLC-1 and according to some embodiments regulated by application of compressed air on the fiber roving.

The actual speed of the wet fiber roving is the cumulated sum of all movements, i.e. the resulting speed considering both the first speed and the second speed.

While the disclosure has been illustrated and described in detail in the drawings and foregoing description, such illustrations and description are to be considered illustrative or exemplary and not restrictive; the disclosure is not limited to the disclosed embodiments.

The invention claimed is:

1. A system for producing an impregnated fiber roving, the system comprising:
   a feed unit comprising a spool with a fiber roving;
   an impregnation unit configured for applying liquid matrix material onto the fiber roving fed from the feed unit;
   a matrix supply unit fluidically connected to the impregnation unit for supplying liquid matrix material to the impregnation unit;
   a tension sensing unit adapted to determine a tension of the fiber roving fed from the feed unit to the impregnation unit;
   a speed sensor for determining a speed of the fiber roving fed from the feed unit to the impregnation unit; and
   control means configured for:
      monitoring the tension determined by the tension sensing unit and adapting the speed of the fiber roving depending on the monitored tension;
      monitoring the fiber roving speed determined by the speed sensor and adapting the supply of liquid matrix material based on the monitored fiber roving speed,
   wherein the system further comprises a guide unit arranged near an outlet aperture of the impregnation unit, the guide unit comprising a guide nozzle and the fiber roving being conveyed through an internal pathway in the guide unit, and
   wherein the guide nozzle comprises blowing nozzles arranged to blow compressed air onto the fiber roving conveyed through the guide unit in such a way as to accelerate the fiber roving.

2. The system according to claim 1, wherein the spool is coupled to a drive motor; and the control means are configured to regulate a rotation speed of the spool in order to maintain a target tension of the fiber roving.

3. The system according to claim 1, wherein controlling the supply of liquid matrix material includes controlling a pressure and/or flow rate of the liquid matrix material.

4. The system according to claim 1, wherein the matrix supply unit comprises at least two tanks connected to a mixing section, the mixing section being connected by a matrix feed piping to the impregnation unit, a first tank comprising a resin and a second tank comprising a hardener.

5. The system according to claim 4, wherein the mixing section comprises a chamber and a mixing pipe, the mixing pipe being arranged downstream of the chamber.

6. The system according to claim 4, wherein the mixing section is connected to the first tank by a first dosing device and is connected to the second tank by a second dosing device.

7. The system according to claim 1, wherein the matrix supply unit comprises at least one tank connected to the impregnation unit.

8. The system according to claim 6, wherein at least one of the dosing devices comprises a motorized pump.

9. The system according to claim 8, wherein adapting the supply of liquid matrix material includes regulating a pumping rate of the at least one of the dosing devices based on the fiber roving speed.

10. The system according to claim 1, wherein the guide unit further comprises a motorized feeder.

11. The system according to claim 1, wherein the guide nozzle is a flexible spring loaded nozzle and/or a bended nozzle.

12. The system according to claim 4, wherein the matrix supply unit further comprises a first flowrate sensor arranged between the first tank and the mixing section and a second flowrate sensor arranged between the second tank and the mixing section, and wherein adapting the supply of liquid matrix material includes increasing and/or decreasing a flow of resin from the first tank to the mixing section and/or a flow of hardener from the second tank to the mixing section based on the fiber roving speed.

13. The system according to claim 4, wherein each one of the first tank, the second tank and the mixing section comprises at least one temperature sensor.

14. The system according to claim 12, wherein the first tank, the second tank and the mixing section each comprises a heating arrangement controlled by the control means.

15. The system according to claim 4, wherein the mixing section further comprises a first pressure sensor adapted for determining a pressure of the resin, a second pressure sensor for determining a pressure of the hardener and a third pressure sensor for determining a pressure of the matrix, and wherein the control means is adapted to regulate at least one of the respective pressures based on the fiber roving speed.

16. The system according to claim 1, wherein the tension sensing unit comprises a tensioner and a positioning sensor.

17. An industrial robot comprising a system for producing an impregnated fiber roving according to claim 1.

18. The industrial robot according to claim 17, wherein the industrial robot is a vertical articulated robot, and wherein the matrix material supplying unit is mounted on a 4th axis of the robot and the impregnation unit is mounted on a 6th axis of the robot.

19. A method for producing an impregnated fiber roving, wherein a fiber roving is fed from a feed unit including a fiber roving spool to an impregnation unit configured for applying liquid matrix material onto the fed fiber roving, the method comprising:
   monitoring a tension and a speed of the fiber roving fed from the feed unit to the impregnation unit;
   adapting the fiber roving speed based on the monitored tension;
   supplying liquid matrix material from a matrix supply unit to the impregnation unit as a function of the monitored fiber roving speed, the method further comprising:
- conveying the fiber roving from the impregnation unit to a guide unit arranged near an outlet aperture of the impregnation unit, the guide unit comprising a guide nozzle and the fiber roving being conveyed through an internal pathway in the guide unit, and
- wherein the guide nozzle comprises blowing nozzles arranged to blow compressed air onto the fiber roving conveyed through the guide unit in such a way as to accelerate the fiber roving.

20. The method according to claim 19, wherein the spool is coupled to a drive electric motor and a rotation speed of the spool is controlled in order to maintain a target tension of the fiber roving.

21. The method according to claim 19, wherein supplying liquid matrix material includes controlling a pressure and/or flow rate of the liquid matrix material.

22. The method according to claim 19, wherein the matrix supply unit comprises at least two tanks connected to a mixing section, the mixing section being connected by a matrix feed piping to the impregnation unit, the first tank comprising a resin and the second tank comprising a hardener; wherein the mixing section is connected to the first tank by a first dosing device, and is connected to the second tank by a second dosing device; and wherein adapting the supply of liquid matrix material includes regulating a dosing rate of the first and/or second dosing device based on the fiber roving speed.

23. The method according to claim 19, wherein the matrix supply unit comprises a single tank containing a pre-processed matrix, the tank being connected to the impregnation unit.

\* \* \* \* \*